United States Patent
Amagai et al.

(10) Patent No.: US 7,282,175 B2
(45) Date of Patent: Oct. 16, 2007

(54) LEAD-FREE SOLDER

(75) Inventors: Masazumi Amagai, Tsukuba (JP); Masako Watanabe, Oita (JP); Kensho Murata, Beppu (JP); Yoshitaka Toyoda, Satte (JP); Minoru Ueshima, Misato (JP); Tsukasa Ohnishi, Souka (JP); Takeshi Tashima, Ohnojo (JP); Daisuke Souma, Tochigi (JP); Takahiro Roppongi, Tochigi (JP); Hiroshi Okada, Souka (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 513 days.

(21) Appl. No.: 10/824,647

(22) Filed: Apr. 15, 2004

(65) Prior Publication Data

US 2004/0262779 A1     Dec. 30, 2004

(30) Foreign Application Priority Data

Apr. 17, 2003   (JP)   ............................. 2003-112287

(51) Int. Cl.
*C22C 13/02*   (2006.01)
(52) U.S. Cl. ........................ 420/562; 420/557; 148/400
(58) Field of Classification Search ................ 148/400; 420/562, 557
See application file for complete search history.

(56) References Cited

U.S. PATENT DOCUMENTS

| | | | |
|---|---|---|---|
| 6,179,935 B1 | 1/2001 | Yamashita et al. | 148/400 |
| 6,843,862 B2 | 1/2005 | Chew et al. | 148/400 |
| 2002/0051728 A1 | 5/2002 | Sato et al. | 420/562 |
| 2003/0024733 A1 | 2/2003 | Aoyama et al. | 174/260 |

FOREIGN PATENT DOCUMENTS

EP    0336575    10/1989

OTHER PUBLICATIONS

Patent Abstracts of Japan, vol. 2000, No. 20, Jul. 10, 2001, abstract of JP 2001-071173 A published on Mar. 21, 2001.
Patent Abstracts of Japan, vol. 2000, No. 04, Aug. 31, 2000, abstract of JP 2000-015476 A published on Jan. 18, 2000.
Patent Abstracts of Japan, vol. 1998, No. 08, Jun. 30, 1998, abstract of JP 10-076389 A published on Mar. 24, 1998.
Patent Abstracts of Japan, vol. 2002, No. 12, Dec. 12, 2002, abstract of JP 2002-239780 A published on Aug. 28, 2002.

*Primary Examiner*—Sikyin Ip
(74) *Attorney, Agent, or Firm*—Michael Tobias

(57) ABSTRACT

A lead-free solder includes 0.05-5 mass % of Ag, 0.01-0.5 mass % of Cu, at least one of P, Ge, Ga, Al, and Si in a total amount of 0.001-0.05 mass %, and a remainder of Sn. One or more of a transition element for improving resistance to heat cycles, a melting point lowering element such as Bi, In, or Zn, and an element for improving impact resistance such as Sb may be added.

13 Claims, No Drawings

LEAD-FREE SOLDER

TECHNICAL FIELD

This invention relates to a lead-free solder suitable for soldering of electronic parts. In particular, it relates to a lead-free solder suitable for forming minute soldered joints such as those formed by solder bumps. This invention also relates to a solder ball and a solder bump made of the lead-free solder.

BACKGROUND ART

There is a constant demand for decreases in the size and increases in the operating speed of electronic equipment. In order to cope with this demand, it is necessary to decrease the size of electronic parts used in electronic equipment and to make the parts multi-functional. A representative example of electronic parts at which efforts are directed to produce decreases in size and multi-functionality are BGA (ball grid array) packages.

A BGA package typically includes a substrate having a semiconductor integrated circuit (IC) chip mounted on its top surface and an array of electrodes formed on its bottom surface. A rounded mass of solder, referred to as a solder bump, is attached to each of the electrodes. The BGA package can be connected to a printed circuit board, for example, by placing the BGA package atop a printed circuit board with each of the solder bumps of the package contacting a corresponding electrically conducting land of the printed circuit board, and then heating the BGA package and the printed circuit board so as to melt the solder bumps and solder them to the lands. Each of the solder bumps forms a minute soldered joint which mechanically and electrically connects the BGA package to the printed circuit board. The use of solder bumps is advantageous in that it enables a large number of uniform soldered joints to be simultaneously formed to all of the electrodes of a BGA package.

BGA packages can have a wide range of sizes and structures. When a BGA package has roughly the same planar dimensions as the integrated circuit chip mounted on its substrate, it is classified as a CSP (chip scale package). When a BGA package includes a plurality of IC chips, it is classified as a MCM (multi-chip module).

The solder bumps of a BGA package can be formed by a number of methods. One method employs solder balls. In this method, the electrodes of the substrate of the BGA, which may be in the form of a discrete substrate or a wafer to be cut into a number of substrates), are coated with a sticky flux, and previously formed solder balls are placed atop the coated electrodes and held thereon by the flux. The BGA substrate is then heated in a heating apparatus such as a reflow furnace to a temperature sufficient to melt the solder balls and form them into solder bumps on the electrodes.

Another method of forming solder bumps employs a solder paste, which comprises solder powder mixed with a pasty flux. In this method, solder bumps are generally formed on a wafer having lands in positions on which bumps are to be formed. A metal mask having holes of about the same size as the lands of a wafer is placed atop the wafer with the holes in alignment with the lands. Solder paste is then printed on the lands by forcing the solder paste through the holes in the mask using a squeegee. The wafer printed with the solder paste is then heated in a reflow furnace so as to melt the solder powder and form it into solder bumps on the lands of the wafer.

In the past, solder balls made of a Sn—Pb alloy were commonly used to form solder bumps for BGA packages. A Sn—Pb solder ball not only has excellent solderability with respect to the electrodes of a BGA substrate, but a Sn—Pb alloy, and particularly the eutectic composition, has a sufficiently low melting point that harmful thermal effects are not imparted to a BGA package or to a printed circuit board during soldering. At the same time, its melting point is sufficiently high that it will not melt at the temperatures produced inside electronic equipment by the heat generated by coils, power transistors, resistors, and other components during the operation of the electronic equipment.

When electronic equipment containing a BGA package formed using Sn—Pb solder balls becomes old and can no longer be used as desired or malfunctions, the equipment is usually not upgraded in performance or repaired but is almost always discarded. When such equipment is discarded, some portions of the equipment are capable of being reused or recycled. For example, plastics in cases, metals in frames, and precious metals in electronic parts are often recovered. However, a printed circuit board with components soldered to it typically cannot be reused. This is because the lands of a printed circuit board are metallically bonded to the solder, and it is difficult to completely separate the solder and the lands from each other. Therefore, discarded printed circuit boards are usually pulverized and then disposed of by burial in landfills.

If a printed circuit board which is disposed of by burial employs a lead-containing solder, such as a Sn—Pb solder, and if the printed circuit board is contacted by acid rain having a high pH, lead in the Sn—Pb solder can be dissolved out and mixed with rain water into underground water. If humans or livestock drink underground water containing lead over a long period, the lead can accumulate in the body and may cause lead poisoning. To avoid the environmental and health problems associated with the use of lead-containing solders, there is a movement in the electronics industry towards the use of so-called lead-free solders which do not contain lead.

Most lead-free solders are Sn alloys containing one or more of Ag, Cu, Sb, In, Bi, Zn, Ni, Cr, Co, Fe, P, Ge, and Ga. Among lead-free solders which are commonly used, those used for low to moderate temperatures include Sn—Bi based alloys, Sn—In based alloys, and Sn—Zn based alloys. However, these alloys have a number of problems for use as solders. For example, Sn—Bi based alloys easily undergo brittle fracture, Sn—In based alloys are expensive, and Sn—Zn based alloys easily undergo changes with time. Furthermore, when low temperature solders are employed in electronic equipment, they may melt when the temperature within a case for the equipment rises due to the generation of heat by heat-generating parts in the equipment. Even if the solders do not melt, their bonding strength may decrease enormously. Therefore, low temperature lead-free solders are limited to special applications.

Lead-free solders for medium temperature use (solders having a melting point somewhat higher than the Sn—Pb eutectic) include Sn—Ag based alloys, Sn—Cu based alloys, and Sn—Ag—Cu based alloys. Sn—Ag based alloys and Sn—Cu based alloys have problems with respect to wettability and resistance to heat cycles. Sn—Ag—Cu based alloys do not have the problems suffered by Sn—Ag based alloys and Sn—Cu based alloys and currently are the most widely used as lead-free solders.

When a Sn—Ag—Cu based alloy is used as lead-free solder to solder a component having a comparatively large bonding area, such as is the case with typical surface mounted parts or discrete parts, it is superior to conventional Sn—Pb solders even when it is subjected to impacts and heat cycles. However, as described below, a Sn—Ag—Cu based lead-free solder has problems when used to form solder bumps on minute electrodes, such as those of BGA packages.

So-called mobile electronic equipment such as mobile telephones, notebook computers, video cameras, and digital cameras often receives impacts from external forces. When such equipment contains a BGA package using a Sn—Ag—Cu based lead-free solder to connect the BGA package to a printed circuit board in the equipment, the soldered joints connecting the BGA package to the printed circuit board may sometimes be detached from the printed circuit board when subjected to an impact. When such detachment occurs, the electronic equipment can no longer function properly. Impacts sufficient to cause such detachment can easily occur during ordinary use of mobile electronic equipment. For example, a mobile telephone placed into a shirt pocket of a user may slip out and fall from the pocket when the user bends forward. Recent mobile telephones which have an e-mail function can easily be dropped when being operated by the user with one hand. When a notebook computer is carried in a briefcase, a significant impact can easily be applied to the computer if the owner accidentally drops the entire briefcase. In addition, it is not uncommon for a video camera or a digital camera to be dropped during use.

After solder bumps are formed on a BGA package, the package is subjected to a high temperature storage test. A high temperature storage test is a test which ascertains whether a BGA package undergoes deterioration in performance due to heat when electronic equipment containing the BGA package is left in a high temperature environment during use. The conditions of a high temperature storage test depend upon the manufacturer of electronic parts or the manufacturer of electronic equipment, but normally the test is carried out by leaving equipment for 12 to 24 hours in a high temperature atmosphere at 125-150° C. With a conventional Sn—Ag—Cu based lead-free solder, the solder bumps of a BGA package often undergo yellowing, i.e., the surfaces of the solder bumps become yellow, during a high temperature storage test. If the surfaces of solder bumps undergo yellowing in a high temperature storage test, when the solder bumps are subsequently inspected by image processing, accurate inspection cannot be performed. Thus, the yellowing may cause inspection errors.

Another problem of existing Sn—Ag—Cu based lead-free solders is that they do not have adequate resistance to heat cycles. When electronic equipment is operating, the electric current flowing through components of the equipment such as coils, power transistors, and resistors generates heat, and the interior of a case of the equipment rises in temperature. When the equipment is turned off and the current is stopped, heat is no longer generated by the components, and the interior of the case returns to room temperature. Each time electronic equipment is turned on and off in this manner, a heat cycle is repeated in which the temperature within the case rises and fall. Heat cycles also affect printed circuit boards and soldered joints in the equipment, causing thermal expansion and contraction of the printed circuit boards and the solder in the soldered joints connected to the printed circuit boards.

The coefficient of thermal expansion of the solder in soldered joints is significantly different from that of printed circuit boards, which are made of plastic. Therefore, when a rise in temperature takes place within electronic equipment, the amount of expansion of a soldered joint is constrained by the printed circuit solder to which it is connected, which has a lower coefficient of thermal expansion. On the other hand, when a soldered joint is subjected to a fall in temperature, its contraction is constrained by the printed circuit board. Therefore, as a result of electronic equipment being repeatedly turned on and off, soldered joints are exposed to heat cycles, and due to the stress in the soldered joints resulting from being constrained in elongation and contraction, metal fatigue takes place in the joints. Eventually cracking or fracture of the soldered joints can occur, and the soldered joints can then be detached from the printed circuit board. The same situation is found more or less between the soldered joints and the BGA package. For general use, a Sn—Ag—Cu based lead-free solder is greatly superior to a Sn—Pb solder with respect to resistance to heat cycles, but its resistance to heat cycles is still not sufficient for use when forming minute soldered joints for BGA packages.

SUMMARY OF THE INVENTION

The present invention provides a lead-free solder which is suitable for use in forming minute soldered joints of electronic parts, and particularly for forming solder bumps of a BGA package. The lead-free solder has excellent resistance to impacts and does not undergo yellowing at the time of bump formation. In addition, the solder has improved resistance to heat cycles.

The present invention also provides a solder ball and a solder bump comprising such a lead-free solder.

The present invention additionally provides a BGA package including a plurality of solder bumps comprising such a lead-free solder which are formed in a predetermined array, such as a grid-like array.

The present inventors found that impact resistance and resistance to yellowing of a Sn—Ag—Cu based lead-free solder can be improved by the addition of at least one of P, Ge, Ga, Al, and Si, preferably with a decrease in the content of Cu. They also found that impact resistance can be further improved by the addition of Sb, and that resistance to heat cycles can be improved by the addition of a transition element.

Accordingly, in one form of the present invention, a lead-free solder comprises 0.05-5 mass % of Ag, 0.01-0.5 mass % of Cu, a total of 0.001-0.05 mass % of at least one of P, Ge, Ga, Al, and Si, and a remainder of Sn. The lead-free solder may additionally include at most 0.1 mass % of at least one transition element to improve resistance to heat cycles. It may also include at most 5 mass % of at least one of Bi, In, and Zn to lower the melting point of the solder. Furthermore, it may include at most 1 mass % of Sb to improve impact resistance.

In other forms, the present invention also provides a solder ball and a solder bump comprising a lead-free solder according to the present invention, and a BGA package including a plurality of bumps comprising a lead-free solder according to the present invention.

A BGA package according to the present invention will typically include a substrate, a semiconductor chip disposed on a first side of the substrate, and a plurality of solder bumps of a lead-free solder according to the present invention formed in an array on a second side of the substrate and electrically connected to the semiconductor chip. The solder bumps are not restricted to any particular arrangement on the substrate and can be disposed in any type of array employed in conventional BGA packages. For example, they can be arranged in a plurality of parallel rows, or they can be arranged in a grid-like array with a plurality of parallel rows and a plurality of parallel columns extending perpendicular to the rows. There are no restrictions on the size of a BGA package according to the present invention. For example, among other types of BGA package, it may be a chip scale package or a multi-chip module.

DESCRIPTION OF PREFERRED EMBODIMENTS

The reasons for the ranges on the components of a lead-free solder according to the present invention will next be described.

The addition of Ag to a Sn—based lead-free solder provides the solder with improved solderability. In general, with a solder for use in soldering components having large bonding areas, the addition of at least 0.3 mass % of Ag is suitable in order to obtain good spreadability of the solder over a large bonding area. However, with a solder for use in forming solder bumps for a BGA package, it is possible to employ a lower content of Ag and yet still obtain adequate spreadability of the solder. Solder balls for use in forming solder bumps of a BGA package typically have a small diameter of 0.25-0.76 mm, and the electrodes of a BGA substrate to which the solder balls are bonded to form solder bumps have dimensions even smaller than the diameter of the solder balls. On account of this small area, a solder ball can adhere to the entire area of an electrode of a BGA substrate even if the solder ball is made of a solder having an Ag content significantly lower than that employed in solders for other types of soldering. In a lead-free solder according to the present invention, an Ag content of at least 0.05 mass % provides solder bumps which can adequately wet and adhere to the electrodes of a BGA substrate. However, if the Ag content exceeds 5 weight %, the melting temperature of the solder becomes abruptly higher, and a BGA package can be thermally damaged by the higher temperatures required for bump formation.

Thus, a lead-free solder according to the present invention has an Ag content of from 0.05 to 5 mass %. Preferably, the Ag content is 0.1-4 mass %, more preferably 0.5-3.5 mass %, and most preferably 0.8-2.5 mass %.

As described above, a Sn—Ag—Cu based lead-free solder has excellent impact resistance when used to solder components having large bonding areas, such as typical surface mounted parts or discrete parts having long leads. Namely, when the bonding area to which solder is to be bonded is of a certain size, a soldered joint for an electronic part can be formed which does not undergo detachment when electronic equipment containing the electronic part is dropped. However, with electronic equipment containing a BGA package, which has extremely small bonding areas, detachment of soldered joints may occur under the impact of dropping the electronic equipment.

In the present invention, Cu and at least one of P, Ge, Ga, Al, and Si are present together in the solder, and the growth of intermetallic compounds formed at the time of bump formation from Sn and another metal (such as Cu or Ni, which are materials of soldered portions such as electrodes of BGA substrates and lands of printed circuit boards) is suppressed. As a result, detachment of soldered joints under the impact caused by dropping of electronic equipment is prevented. In the presence of at least one of P, Ge, Ga, Al, and Si, the effect of suppressing intermetallic compounds is not obtained if the content of Cu is smaller than 0.01 mass %. On the other hand, Cu causes the formation of voids, which increase in occurrence as the content of Cu increases. However, when the Cu content is at most 0.5 mass %, the effect of Cu on suppressing intermetallic compounds outweighs the effect of Cu on increasing voids, so the net result of the addition of Cu is that the resistance to impacts caused by dropping of electronic equipment increases. Accordingly, in the present invention, the content of Cu is 0.01-0.5 mass %. Preferably, the Cu content is 0.02-0.3 mass %, more preferably 0.03-0.2 mass %, and most preferably 0.05-0.1 mass %.

In a Sn based lead-free solder, P, Ge, Ga, Al, and Si also have the effect of preventing yellowing of a solder bump surface caused by heating at the time of solder bump formation. If the total amount of P, Ge, Ga, Al, and Si is less than 0.001 mass %, this effect cannot be obtained, whereas the presence of a total of more than 0.05 mass % of these elements worsens solderability.

Thus, the total content of at least one of P, Ge, Ga, Al, and Si is 0.001-0.05 mass %, and it is preferably 0.002-0.02 mass % and more preferably 0.003-0.01 mass %.

When components having a large bonding area for solder are soldered with a Sn—Ag—Cu based lead-free solder, the soldered joints which are formed have excellent resistance to heat cycles, but with a component such as a BGA package having minute bonding areas, when the soldered joints are subjected to heat cycles over a long period, cracking and fracture of the soldered portions may occur. In the present invention, a minute amount of at least one transition element may be added to a Sn—Ag—Cu based solder to improve the resistance of the solder to heat cycles. As described above, heat cycles are applied to soldered joints when electronic equipment is repeatedly turned on and off. The addition of a minute amount of at least one transition element to a Sn—Ag—Cu based solder has the effect of improving resistance to heat cycles. If the content of a transition element (or the total content of transition elements when two or more transition elements are present) exceeds 0.1 mass %, not only does the melting point of the solder increase, but solderability is worsened. The effect of improving resistance to heat cycles becomes appreciable when the content of a transition element which is added is at least 0.001 mass %. Preferably the total content of one or more transition elements, when added, is 0.005-0.08 mass % and more preferably 0.01-0.05 mass %.

A "transition element" as used herein indicates those elements belonging to Groups 3 to 11 of the periodic table. It includes lanthanides and actinide but excludes Ag and Cu, which are both essential elements in the solder according to the present invention.

In order to lower its melting point, a solder according to the present invention may include one or more of any one of Bi, In, and Zn in an amount of at most 5 mass % for each. If any of these melting point lowering elements has a content of greater than 5 mass %, a binary system of the element having a content greater than 5 mass % with Sn having a low solidus temperature appears, such as a Sn—Bi system having a solidus temperature of 139° C., a Sn—In system having a solidus temperature of 117° C., or a Sn—Zn system having a solidus temperature of 199° C., and such a binary alloy worsens the heat resistance of the solder. When any of Bi, In, and Zn is added, the individual content of any of these elements which is added is preferably at least 0.5 mass % and at most 3 mass %.

A solder according to the present invention may also include at most 1 mass % of Sb, which is effective at improving impact resistance. However, if the content of Sb exceeds 1 mass %, brittleness develops, and the impact resistance of the solder ends up worsening. When added, the Sb content is preferably at least 0.1 mass % and at most 0.8 mass %.

As stated above, the remainder of the alloy composition of a solder according to the present invention is Sn, which is the main element of the solder, and incidental impurities. The Sn content is preferably in the range of 90-99.8 mass % and more preferably in the range of 95-99.5 mass %.

A lead-free solder according to the present invention is not restricted to any particular manner of use, but it is particularly suitable for forming solder bumps for forming minute soldered joints for electronic parts, such as BGA packages, by reflow soldering.

The solder can be formed into solder bumps by any of the techniques conventionally used for this purpose. For example, the solder can be first formed into solder balls, which are then placed on electrodes (lands or electrode pads) of a substrate and heated to form the solder balls into solder bumps. The electrodes are normally coated or printed with a pasty flux or solder paste before solder balls are placed thereon.

Alternatively, the solder can be used in the form of a solder paste by preparing a powder from the solder and mixing the solder powder with a flux. The solder paste can be applied to the electrodes (lands or electrode pads) of a substrate or wafer by printing, for example, and the solder paste can then be formed into solder bumps by heating.

When solder bumps are to be formed from solder balls, the solder can be formed into solder balls by any of a variety of methods. For example, solder balls can be formed by an oil bath method, such as that disclosed in U.S. Pat. No. 5,653,783 and JP 07-300606A (1995), and a direct method, such as that disclosed in U.S. Pat. No. 5,445,666. The solder balls can have any diameter suitable for the type of electronic component with which the solder balls are to be used. A typical diameter is in the range of from 0.05 mm to 1.0 mm. The diameter of the solder balls should be substantially uniform, such as with a dimensional tolerance (variation in diameter) of up to ±20 micrometer and preferably up to ±10 micrometers. The solder balls should also have a good sphericity. The sphericity is preferably at most 3% and more preferably at most 1.5%. The sphericity of a solder ball, in percent, is defined by the formula $|A-B|\div(\{A+B\}\div2)\times100$, wherein A and B are the maximum and minimum diameters of the solder ball.

In the case of a solder paste, the solder can be formed into a powder form by any appropriate method including gas atomization. The powder typically has an average particle diameter of 5-15 micrometers or 15-25 micrometers. A flux used to prepare the solder paste may be a rosin flux or a non-rosin flux. Preferably, it is an activated rosin flux containing an activator such as an amine hydrohalide and optionally a thixotropic agent. The solder powder typically comprises from 85 to 95 mass % of the solder paste.

The present invention will be described in further detail while referring to the following examples, which should be considered to be illustrative and not restrictive.

EXAMPLES

Examples of a solder according to the present invention and comparative examples having the compositions shown in Table 1 were prepared by standard procedures. The solders were formed into solder balls each having a diameter of 0.3 mm by the oil bath method.

Using the solder balls, each of the solders was tested for impact resistance, yellowing, and resistance to heat cycles in the manner described below. The test results are also shown in Table 1.

[Impact Resistance Test]

In this test, an impact was applied to a CSP substrate and a printed circuit board to which the CSP substrate was soldered by solder bumps comprising one of the solders shown in Table 1. The test was performed in the following manner.

(1) A sticky activated rosin flux was applied by printing to the electrodes of a CSP substrate (measuring 10×10 mm) having 150 electrodes each with a diameter of 0.25 mm. A solder ball having a diameter of 0.3 mm and comprising one of the solders shown in Table 1 was placed on each of the flux-coated electrode of the substrate.

(2) The CSP substrate on which the solder balls were placed was heated in a reflow furnace to a temperature sufficient to melt the solder balls and form them into solder bumps secured to the electrodes of the CSP substrate. The heating temperature was generally 240-250° C.

(3) The CSP substrate on which the solder bumps were formed was placed on the center of a glass epoxy printed circuit board measuring 30×120 mm with each of the solder bumps resting on a land of the printed circuit board. Heating was performed in a reflow furnace to a temperature sufficient to solder the CSP substrate to the printed circuit board by the solder bumps. The heating temperature was also generally 240-250° C.

(4) Impacts were imparted to the printed circuit board and the CSP substrate by the following testing device. The testing device include two upright support legs extending parallel to each other upwards from a base. A rectangular frame, resembling a picture frame, was slidably supported between the support legs so as to be capable of being raised by hand along the support legs and then being vertically dropped while being guided by the support legs. The rectangular frame was made of four 40-mm wide stainless steel plates and had outer dimensions of 200 mm wide by 80 mm high. A U-shaped projection was secured to and extended downwards from the bottom plate of the rectangular frame. Two bolts were screwed into holes previously formed in the printed circuit board near its lengthwise ends, and then the bolts were screwed into the top plate of the rectangular frame so as to extend upwards from the top plate in parallel with each other. Once the bolts were screwed into the rectangular frame, the printed circuit board was horizontally disposed above the rectangular frame, with the CSP substrate on the bottom surface of the printed circuit board. The printed circuit board was secured to the rectangular frame by the bolts so that the printed circuit board could be raised and lowered along the support legs together with the rectangular frame as a single body, but the printed circuit board was vertically spaced from the rectangular frame so that neither the printed circuit board nor the CSP substrate contacted the rectangular frame. Thus, the printed circuit board directly contacted only the two bolts. A concrete block was disposed on the base of the testing device directly beneath the U-shaped projection of the rectangular frame.

(5) An impact was imparted to the printed circuit board and the CSP substrate by raising the rectangular frame along the upright support legs to a height of 500 mm above the concrete block, and then releasing the rectangular frame, allowing it to drop while being guided by the support legs until the U-shaped projection on the rectangular frame impacted the concrete block. The impact caused the printed circuit board to vibrate on the bolts, and the vibration applied an impact to the soldered joints connecting the printed circuit board to the CSP substrate. Dropping of the rectangular frame onto the concrete block in this manner was repeated until the CSP substrate became detached from the printed circuit board as a result of the impacts. The number of times that dropping was performed until detachment took place was measured.

[Yellowing Test]

In this test, the surfaces of the solder balls made of various solders shown in Table 1 were visually observed for yellowing after high temperature heating in the following manner.

(1) Solder balls having a diameter of 0.3 mm and comprising one of the solders shown in Table 1 were disposed on the electrodes of a CSP substrate which had been coated with the same flux as used in the impact resistance test.

(2) The CSP substrate on which the solder balls were placed was heated in a reflow furnace to a temperature which was lower than 250° C. and which was sufficient to melt the solder balls and form them into solder bumps secured to the electrodes of the CSP substrate.

(3) The resulting CSP substrate having solder bumps formed thereon was left for 24 hours in a thermostat at 150° C. to simulate a high temperature storage test. Thereafter, the degree of yellowing of the solder bumps was visually observed. In the column for "Yellowing" in Table 1, solders for which there was no or little yellowing are indicated as "No", and ones for which there was prominent yellowing are indicated as "Yes".

[Test of Resistance to Heat Cycles]

In this test, a printed circuit board on which electronic parts were mounted was subjected to heat cycles, and the number of cycles until damage or fracture of a soldered joint occurred was measured in the following manner.

(1) A sticky activated rosin flux was applied by printing to the electrodes of a CSP substrate (measuring 10×10 mm) having 150 electrodes each with a diameter of 0.25 mm. A solder ball having a diameter of 0.3 mm and comprising one of the solders shown in Table 1 was placed on each of the flux-coated electrode of the substrate.

(2) The CSP substrate on which the solder balls were placed was heated in a reflow furnace to a temperature sufficient to melt the solder balls and form them into solder bumps secured to the electrodes of the CSP substrate. The heating temperature was generally 240-250° C.

(3) The CSP substrate on which the solder bumps were formed was placed on a glass epoxy printed circuit board measuring 120×140 mm with each of the solder bumps contacting a corresponding land of the printed circuit board. Heating was then performed in a reflow furnace to a temperature sufficient to solder the CSP substrate to the printed circuit board by the solder bumps. The heating temperature was again generally 240-250° C.

(4) The printed circuit board and the CSP substrate soldered thereto were subjected to heat cycles comprising exposure to −40° C. for 10 minutes and +120° C. for 10 minutes. The number of cycles until cracks or fracture of the soldered joints occurred was measured, the occurrence of these cracks or fracture being detected by a conducting defect.

In the examples shown in the following table, Examples 1 to 14 are examples according to the present invention and Examples 15 to 19 are comparative examples illustrating conventional lead-free solder alloys.

TABLE 1

| | Solder composition (mass %) (Bal. = balance) | | | | | | | Resistance to impact (number of | | Resistance to heat |
|---|---|---|---|---|---|---|---|---|---|---|
| Example No. | Sn | Ag | Cu | P, Ge, Ga, Al, Si | Transition element | Bi, In, Zn | Sb | times dropped) | Yellowing | cycles (cycles) |
| 1 | Bal. | 1 | 0.07 | 0.005 P | | | | 85 | No | 1800 |
| 2 | Bal. | 0.5 | 0.1 | 0.01 P | | | | 87 | No | 1600 |
| 3 | Bal. | 2 | 0.5 | 0.008 P | 0.05 Ni | | | 68 | No | 2200 |
| 4 | Bal. | 1 | 0.5 | 0.005 P | 0.05 Ni 0.01 Co | | | 91 | No | 2000 |
| 5 | Bal. | 3 | 0.07 | 0.007 P | 0.01 Co | | | 62 | No | 2300 |
| 6 | Bal. | 1 | 0.05 | 0.005 Ge | 0.01 Ti | | | 70 | No | 2000 |
| 7 | Bal. | 1 | 0.05 | 0.005 Al | 0.01 W | | | 75 | No | 1900 |
| 8 | Bal. | 1 | 0.05 | 0.005 Si | 0.01 Mn | | | 74 | No | 1900 |
| 9 | Bal. | 1 | 0.05 | 0.005 Ga | 0.01 La | | | 69 | No | 2000 |
| 10 | Bal. | 1 | 0.05 | 0.005 P | 0.01 Au | | | 76 | No | 1900 |
| 11 | Bal. | 1 | 0.05 | 0.005 P | 0.05 Ni | 1 Bi | | 67 | No | 1700 |
| 12 | Bal. | 1 | 0.05 | 0.005 P | 0.05 Ni | 2 In | | 73 | No | 1900 |
| 13 | Bal. | 1 | 0.05 | 0.005 P | 0.05 Ni | 2 Zn | | 70 | No | 1700 |
| 14 | Bal. | 1 | 0.05 | 0.005 P | 0.05 Ni | | 0.5 | 93 | No | 2000 |
| 15 | Bal. | 3 | | | | | | 29 | Yes | 1700 |
| 16 | Bal. | | 0.75 | | | | | 69 | Yes | 1200 |
| 17 | Bal. | 0.3 | 0.7 | | | | | 68 | Yes | 1400 |
| 18 | Bal. | 1 | 0.5 | | | | | 63 | Yes | 1600 |
| 19 | Bal. | 3 | 0.5 | | | | | 43 | Yes | 2000 |

As can be seen from the table, the lead-free solders of Examples 1 to 14 which were solders according to the present invention had excellent resistance to impacts, yellowing, and heat cycles superior to that of conventional lead-free solders shown in Examples 15 to 19. Thus, a solder bump formed from a lead-free solder according to the present invention has the excellent effects which cannot be achieved by the prior art. For example, when a soldered joint formed from a lead-free solder according to the present invention is used to connect a BGA package or similar device to a printed circuit board, the soldered joints are not readily detached from the printed circuit board when electronic equipment containing the BGA package is subjected to an impact. Therefore, the reliability of the electronic equipment can be greatly increased. Furthermore, a solder bump formed from a solder according to the present invention does not undergo yellowing in a high temperature storage test, so inspection of solder bumps by image processing can be accurately carried out. In addition, a lead-free solder according to the present invention increases the resistance to heat cycles of minute soldered joints of electronic parts, so even when electronic equipment containing the parts is repeatedly turned on and off over long periods, failure of soldered joints does not readily take place.

What is claimed is:

1. A lead-free solder consisting of 0.05-5 mass % of Ag, 0.01-0.5 mass % of Cu, 0.001-0.05 mass % of P, at least 0.001 mass % of at least one of Ni and Co with the total amount of Ni and Co being at most 0.1 mass %, and a remainder of Sn.

2. A lead-free solder as claimed in claim 1 containing at most 0.3 mass % of Cu.

3. A lead-free solder as claimed in claim 2 containing at most 0.1 mass % of Cu.

4. A solder bump comprising a lead-free solder as claimed in claim 1.

5. A BGA package including a substrate, a semiconductor chip disposed on a first side of the substrate, and a plurality of solder bumps comprising a lead-free solder as claimed in claim 1 formed in an array on a second side of the substrate and electrically connected to the semiconductor chip.

6. A lead-free solder ball comprising a lead-free solder as claimed in claim 1.

7. A method of forming soldering bumps comprising placing solder balls comprising a lead-free solder as claimed in claim 1 on a substrate and heating the solder balls to melt the solder balls and form them into solder bumps secured to the substrate.

8. A method as claimed in claim 7 including previously preparing the solder balls by dropping pieces of the lead-free solder into a hot oil bath to form the pieces into spheres.

9. A method of forming solder balls comprising dropping pieces of a lead-free solder as claimed in claim 1 into a hot oil bath to form the pieces into spheres.

10. A lead-free solder as claimed in claim 1 containing at least 0.001 mass % of Co.

11. A lead-free solder as claimed in claim 10 containing at least 0.001 mass % of Ni.

12. A lead-free solder as claimed in claim 10 containing a total of 0.005-0.08 mass % of at least one of Ni and Co.

13. A lead-free solder as claimed in claim 10 containing a total of 0.01-0.05 mass % of at least one of Ni and Co.

* * * * *